United States Patent
Yang

(10) Patent No.: US 12,301,736 B2
(45) Date of Patent: May 13, 2025

(54) INTEGRATED CIRCUIT WITH PHYSICALLY UNCLONABLE FUNCTION ROBUST TO MACHINE LEARNING ATTACKS

(71) Applicant: SAMSUNG ELECTRONICS CO., LTD., Suwon-si (KR)

(72) Inventor: Joon-Sung Yang, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 274 days.

(21) Appl. No.: 17/935,314

(22) Filed: Sep. 26, 2022

(65) Prior Publication Data

US 2023/0224172 A1    Jul. 13, 2023

(30) Foreign Application Priority Data

Jan. 12, 2022    (KR) .................. 10-2022-0004399

(51) Int. Cl.
*H04L 9/32*    (2006.01)
*H04L 9/08*    (2006.01)

(52) U.S. Cl.
CPC .......... *H04L 9/3278* (2013.01); *H04L 9/0866* (2013.01); *H04L 9/0877* (2013.01)

(58) Field of Classification Search
CPC .... H04L 9/3278; H04L 9/0866; H04L 9/0877
See application file for complete search history.

(56) References Cited

U.S. PATENT DOCUMENTS

| | | | |
|---|---|---|---|
| 10,027,492 B1* | 7/2018 | Wesselkamper | H03K 19/003 |
| 10,469,271 B2 | 11/2019 | Hung et al. | |
| 10,547,459 B2 | 1/2020 | Gehrer | |
| 10,958,270 B2 | 3/2021 | Lu et al. | |
| 10,958,452 B2 | 3/2021 | Wallrabenstein et al. | |
| 11,102,016 B2 | 8/2021 | Hurwitz | |
| 2010/0176920 A1* | 7/2010 | Kursawe | G06F 21/86 |
| | | | 340/5.74 |

(Continued)

OTHER PUBLICATIONS

Hatti, Kaveri; Paramasivam, C; "The MUX-Based PUF Architecture for Hardware Security," International Conference on Circuits, Controls and Communications (CCUBE), Bangalore, India, 2021, pp. 1-7.*

(Continued)

*Primary Examiner* — Victor Lesniewski
(74) *Attorney, Agent, or Firm* — MORGAN, LEWIS & BOCKIUS LLP

(57) ABSTRACT

An integrated circuit is provided which includes a physically unclonable function (PUF). The integrated circuit comprises a PUF block including a plurality of physically unclonable function (PUF) cells configured to output a cell signal having a unique value according to an input, a conversion unit is configured to receive the cell signal as input, convert the cell signal, and output a conversion signal. A select signal generator provides a first selection signal to the conversion unit. A key generator is configured to receive the conversion signal from the conversion unit and generate a security key therefrom, wherein the conversion unit includes a first layer which outputs a second signal obtained by converting a provided first signal on the basis of a bit value of the first selection signal.

8 Claims, 12 Drawing Sheets

(56) References Cited

U.S. PATENT DOCUMENTS

| | | | | |
|---|---|---|---|---|
| 2014/0189890 A1* | 7/2014 | Koeberl | ............... | G09C 1/00 |
| | | | | 726/34 |
| 2016/0156476 A1* | 6/2016 | Lee | ............... | H04L 9/0866 |
| | | | | 380/44 |
| 2018/0351753 A1* | 12/2018 | Gardner | ............... | H04L 9/3218 |
| 2019/0026724 A1* | 1/2019 | Wade | ............... | G06Q 20/341 |
| 2019/0123917 A1* | 4/2019 | Kim | ............... | H04L 9/3231 |
| 2020/0044872 A1 | 2/2020 | Willsch et al. | | |
| 2020/0210628 A1* | 7/2020 | Karpinskyy | ............... | G06F 21/75 |
| 2021/0083886 A1* | 3/2021 | Lee | ............... | H03K 19/17768 |
| 2021/0336804 A1* | 10/2021 | Parhi | ............... | G06F 21/73 |
| 2022/0029837 A1* | 1/2022 | Ernst | ............... | G06F 21/73 |
| 2023/0091469 A1* | 3/2023 | Wang | ............... | H04L 9/3278 |
| | | | | 713/189 |
| 2024/0171411 A1* | 5/2024 | Wei | ............... | H03L 7/0814 |
| 2024/0187222 A1* | 6/2024 | Lindskog | ............... | H04L 9/0866 |

OTHER PUBLICATIONS

Ramanujam, Srinivasa; Burleson, Wayne; "Reconfiguring the Mux-Based Arbiter PUF using FeFETs," 22nd International Symposium on Quality Electronic Design (ISQED), Santa Clara, CA, USA, 2021, pp. 257-262.*

* cited by examiner

FIG. 7

| Configuration Label | Layer 1 | Layer 2 | $\cdots$ | Layer m |
|---|---|---|---|---|
| 0 | $000...0_2$ | $001...0_2$ | $\cdots$ | $011...0_2$ |
| 1 | $110...0_2$ | $010...0_2$ | $\cdots$ | $000...1_2$ |
| 2 | $001...1_2$ | $110...1_2$ | $\cdots$ | $100...1_2$ |
| 2 | $001...0_2$ | $010...1_2$ | $\cdots$ | $110...1_2$ |
| $\cdots$ | $\cdots$ | $\cdots$ | $\cdots$ | $\cdots$ |
| $2^{\{m(width/2)\}}$ | $000...1_2$ | $100...0_2$ | $\cdots$ | $101...0_2$ |

1000

INTEGRATED CIRCUIT WITH PHYSICALLY UNCLONABLE FUNCTION ROBUST TO MACHINE LEARNING ATTACKS

CROSS-REFERENCE TO RELATED APPLICATION

This application claims priority under 35 U.S.C. § 119 to Korean Patent Application No. 10-2022-0004399 filed on Jan. 12, 2022 in the Korean Intellectual Property Office, the disclosure of which is incorporated by reference herein in its entirety.

TECHNICAL FIELD

The present disclosure relates generally to an integrated circuit including a physically unclonable function (PUF) and more particularly to an integrated circuit including a physically unclonable function (PUF) that is robust to machine learning attacks.

DISCUSSION OF THE RELATED ART

In recent years, various smart devices have been popularized, among them the popularization of smartphones has created new and diverse services and usage environments, such as financial transactions and the field of unmanned automobiles. Due to the spread of the IoT (Internet of Things) environment there is an increased risk of hacking which results in security breaches such as leakage of personal information. As a result, the demand for increased security is on the rise.

One of the technologies being researched to solve these requirements is physically unclonable function (PUF) technology. A physically unclonable function refers to a system that generates an unpredictable random digital value implemented inside a chip, where the random digital value is based on unique physical variations which occur naturally during the semiconductor manufacturing process. Because random values are output that are unpredictable in hardware, they cannot be duplicated.

Specifically, even if the same process is performed using the same circuit and the same mask layout in the chip manufacturing process, there are many differences in circuit characteristics (e.g., gate delay time) that arise from element characteristics such as transistors, capacitors and resistors due to process deviations that occur naturally due to the characteristics of the semiconductor manufacturing process.

Because the physically unclonable function has a bit value of 0 or 1 that differs from chip to chip due to circuit characteristics and the determined value outputs the same value for each generation time unlike the random number generator, it may be used as information unique to the chip. In addition, since the generated values are values generated inside the chip, it is possible to fundamentally block the outflow of generated values to the outside of the chip, thereby making it difficult to read the values against security attacks such as intrusion attacks.

The digital values generated in this way may be used in various regions of a chip such as, for example, a chip ID, an authentication circuit, a symmetric key of an encryption algorithm, and a secret key.

However, more recently, intrusion attacks using machine learning have been made against such physically unclonable functions, requiring a higher level of security. In order to solve this problem, a technology has been developed for predicting the possibility of intrusion attacks in advance, but the technology is problematic due to an overhead cost that may be incurred due to an additional amount of operational processing.

To solve this, there is ongoing research which may internally modify the hardware of the physically unclonable function without increasing the overhead to increase the security level.

SUMMARY

Embodiments of the present disclosure provide an integrated circuit having a physically unclonable function with improved security performance without incurring additional operational overhead.

However, aspects of the present disclosure are not restricted to the embodiments set forth herein.

The above and other aspects of the present disclosure will become more apparent to one of ordinary skill in the art to which the present disclosure pertains by referencing the detailed description provided of the present disclosure provided below.

According to an aspect of the present disclosure, there is provided an integrated circuit comprising, a PUF block including a plurality of physically unclonable function (PUF) cells configured to output a cell signal having a unique value in response to an input, a conversion unit which receives the cell signal as an input converts the cell signal into a conversion signal and outputs the conversion signal, a select signal generator which provides a first selection signal to the conversion unit, and a key generator which receives the conversion signal from the conversion unit and generates a security key, wherein the conversion unit includes a first layer which outputs a second signal obtained by converting a provided first signal on the basis of a bit value of the first selection signal.

According to another aspect of the present disclosure, there is provided an integrated circuit comprising, a PUF block including a plurality of physically unclonable function (PUF) cells configured to output a cell signal having a unique value in response to an input, a conversion unit which receives the cell signal as an input converts the cell signal into a conversion signal, and outputs the conversion signal, a select signal generator which provides a first selection signal to the conversion unit, and a key generator which receives a conversion signal from the conversion unit and generates a security key, wherein the conversion unit includes a first stage which includes a plurality of first logical gates, receives the cell signal, performs a logical operation on the cell signal, and outputs a first signal, and a second stage which includes a plurality of second logical gates, receives a second signal generated on the basis of the first signal, performs a logical operation on the second signal, and outputs a third signal, wherein the conversion unit deactivates a first logical gate of at least a part of the first stage on the basis of the first selection signal, and the conversion unit deactivates a second logical gate of at least a part of the second stage on the basis of the first selection signal.

According to another aspect of the present disclosure, there is provided an integrated circuit comprising, a first XOR gate which receives first and second cell signals having unique values according to an input from a first PUF (Physically Uncle Function) cell and a second PUF cell and outputs a first signal, a second XOR gate which receives third and fourth cell signals having unique values according to an input from third and fourth PUF cells different from the first and second PUF cells, and outputs a second signal different from the first signal, a first multiplexer (MUX) which receives the first signal from the first XOR gate, receives the second signal from the second XOR gate, and outputs the first signal among the first and second signals, and a second multiplexer which receives the first signal from the first XOR gate, receives the second signal from the second XOR gate, and outputs the second signal among the first and second signals, wherein an output of the first multiplexer is determined by a first selection signal provided from the select signal generator, an output of the second multiplexer is determined by a second selection signal provided from the select signal generator, and the first selection signal is different from the second selection signal.

BRIEF DESCRIPTION OF THE DRAWINGS

The above and other aspects and features of the present disclosure will become more clearly understood from the following detailed description taken in conjunction with the accompanying drawings, in which:

FIG. 7 is an exemplary table for explaining the operation of the conversion unit according to an embodiment.

DETAILED DESCRIPTION OF THE EMBODIMENTS

Figure 1:
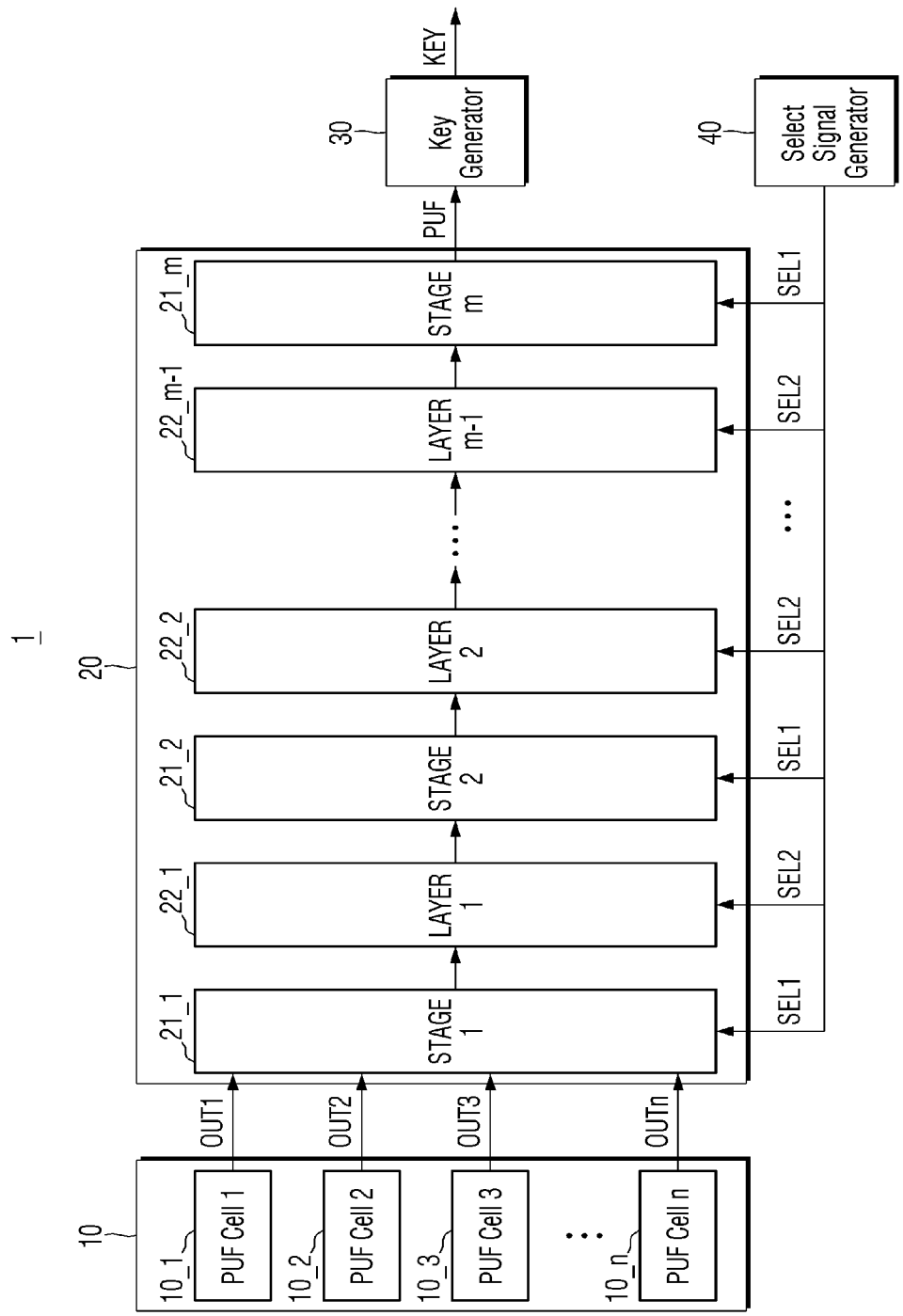
FIG. 1 is an exemplary block diagram for explaining an integrated circuit according to an embodiment.

Hereinafter, embodiments according to the inventive concept will be described referring to the accompanying drawings. Like reference numerals may refer to like elements throughout the accompanying drawings.

It will be understood that the terms "first," "second," "third," etc. are used herein to distinguish one element from another, and the elements are not limited by these terms. Thus, a "first" element in an embodiment may be described as a "second" element in another embodiment.

It should be understood that descriptions of features or aspects within each embodiment should typically be considered as available for other similar features or aspects in other embodiments, unless the context clearly indicates otherwise.

As used herein, the singular forms "a", "an" and "the" are intended to include the plural forms as well, unless the context clearly indicates otherwise.

FIG. 1 is an exemplary block diagram depicting an integrated circuit according to an embodiment.

Referring to FIG. 1, an integrated circuit 1 (IC) may include a PUF (physically unclonable function) block 10, a conversion unit 20, a key generator 30, and a select signal generator 40.

The PUF block 10 may include a plurality of PUF cells 10_1 to 10_n. Each of the plurality of PUF cells 10_1 to 10_n may output cell signals OUT1 to OUTn and provide them to the conversion unit 20.

Here, the plurality of cell signals OUT1 to OUTn output from the PUF block 10 comprise unique values that are output according to outputs of each of the plurality of PUF cells 10_1 to 10_n. For example, the plurality of PUF cells 10_1 to 10_n may output the respective unique values to the cell signals OUT1 to OUTn due to various process variations generated during the manufacturing process.

Specifically, elements or patterns such as transistors included in a plurality of PUF cells 10_1 to 10_n may have unique characteristics that are different from other PUF cells manufactured during the same semiconductor process, due to process variations such as a height, a width, a length, and a doping concentration. Therefore, the cell signals OUT1 to OUTn may each have a unique value, and the security key KEY may be generated using the same unique process.

In an embodiment, each of the cell signals OUT1 to OUTn may have a bit length of one, i.e., i.e., 1-bit signals. Therefore, in the case of the PUF block 10 shown in FIG. 1, n-bit cell signals OUT1 to OUTn of bit length 1 may be provided to the conversion unit 20. However, in other embodiments, the size of the cell signal may have bit lengths of different values, (n-bit length signals where n>1).

The conversion unit 20 may include a plurality of stages 21_1 to 21_m and a corresponding plurality of layers 22_1 to 22_m−1.

Each of the plurality of stages 21_1 to 21_m may include a plurality of logical gates that perform a logical operation. For example, each of the plurality of stages 21_1 to 21_m may include a plurality of XOR gates. However, embodiments of the inventive concept are not limited thereto. For example, in various embodiments, each of the plurality of stages 21_1 to 21_m may include different types of logical gates.

The plurality of layers 22_1 to 22_m−1 may convert the input signal. Specifically, each of the plurality of layers 22_1 to 22_m−1 may receive an input from a previously located stage and provide different outputs to the next stage on the basis of the selection signal SEL.

Each of the plurality of layers 22_1 to 22_m−1 may include a plurality of multiplexers (MUX), where each layer has the same number of multiplexers (MUX). However, the embodiment is not limited thereto. In other embodiments, the plurality of layers 22_1 to 22_m−1 may include a different number of multiplexers (MUX). In yet other embodiments, the plurality of layers 22_1 to 22_m−1 may include other configurations for converting an input signal, such as a switch.

The plurality of stages 21_1 to 21_m and the plurality of layers 22_1 to 22_m−1 may be placed alternately. That is, as shown in FIG. 1, a first layer 22_1 may be configured between a first stage 21_1 and a second stage 21_2, and a second stage 21_2 may be configured between a first layer 22_1 and a second layer 22_2. However, embodiments are not limited thereto. For example, an arrangement relationship between the plurality of stages 21_1 to 21_m and the plurality of layers 22_1 to 22_m-1 may vary according to the embodiment.

The first stage 21_1 of the conversion unit 20 may receive cell signals OUT1 to OUTn from the PUF block 10. The first stage 21_1 may perform a logical operation on the provided cell signals OUT1 to OUTn and provide n output signals from the first stage 21_1 to the first layer 22_1. The logical operation performed by the first stage 21_1 may be, for example, an XOR operation.

Alternatively, the first stage 21_1 may perform the logical operation by activating only some of a plurality of logical gates, where certain logical gates are included on the basis of a first selection signal SEL1 provided from the select signal generator 40. The details of which will be described more fully below.

The first layer 22_1 may receive as input, the output provided from the first stage 21_1 and may generate outputs of various combinations with respect to the output provided from the first stage 21_1, on the basis of a second selection signal SEL2 provided from the select signal generator 40. For example, the first layer 22_1 may output a signal on the basis of the bit value of the second selection signal SEL2. The first layer 22_1 may provide the output to the second stage 21_2.

The key generator 30 may receive the conversion signal PUF from the conversion unit 20. Here, the conversion signal PUF may be a signal that is output in response to an arbitrary input that is input to the PUF block 10. The arbitrary input may generate cell signals OUT1 to OUTn which are provided as inputs to the conversion unit 20. The cell signals OUT1 to OUTn are then converted according to the internal connection structure of the conversion unit. Notably, the process of applying an arbitrary input as input to the PUF block 10 and outputting a conversion signal PUF in a single cycle may be defined herein as a challenge.

The key generator 30 may receive and collect the conversion signal PUF from the conversion unit 20 to generate a security key KEY. For example, the key generator 30 may collect the conversion signal PUF for L challenges to generate the security key KEY. In this case of L challenges, the security key KEY may have a size of n*L bits. However, the embodiment is not limited thereto, and it should be apparent that the size of the security key KEY may vary depending on the respective sizes of the cell signals OUT1 to OUTn provided by PUF block 10, the internal connection structure of the conversion unit 20, and the like.

The select signal generator 40 may generate a selection signal for changing the internal connection structure of the conversion unit 20. Specifically, the select signal generator 40 may generate the first selection signal SEL1 and the second selection signal SEL2 and provide them to the conversion unit 20.

The select signal generator 40 may include information about all internal connection structures of the converter 20 that may be generated. Specifically, the select signal generator 40 may store in advance the values of the selection signals that need to be provided to each of the plurality of layers 22_1 to 22_m-1 to form the specific internal connection structure of the conversion unit 20.

The first selection signal SEL1 is used to determine the logical gate to be activated among the plurality of logical gates included in the plurality of stages 21_1 to 21_m. The second selection signal SEL2 may be used to determine which of the provided inputs the plurality of multiplexers included in the plurality of layers 22_1 to 22_m-1 output. The details of which will be described more fully below.

Figure 2:
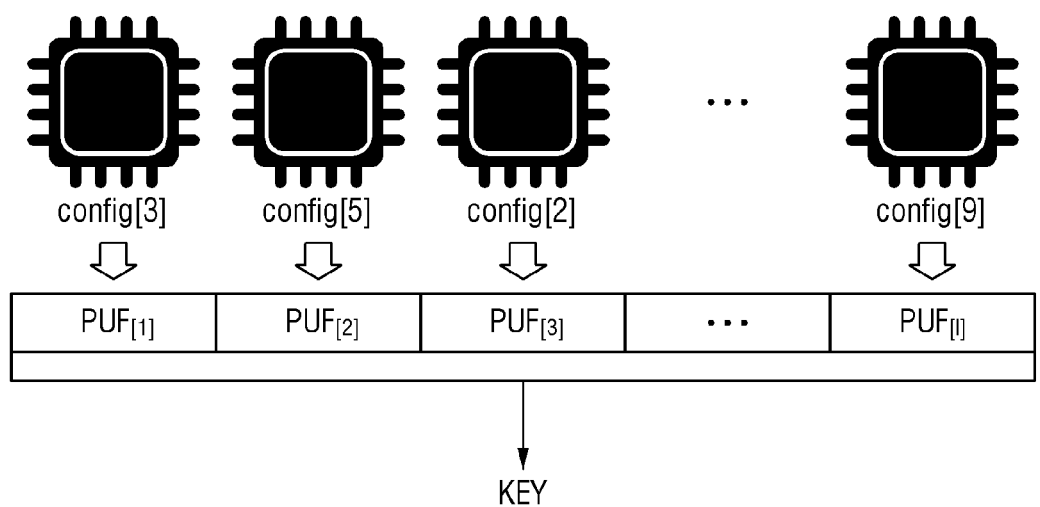
FIG. 2 is an exemplary diagram for explaining the operation of an integrated circuit according to an embodiment.

FIG. 2 is an exemplary diagram depicting the operation of an integrated circuit according to an embodiment Referring to FIG. 2, as described above and shown in FIG. 1, a plurality of PUF signals 10_1 to 10_n may be collected to generate the security key KEY. Specifically FIG. 2 illustrates that one challenge is performed to generate one PUF signal (PUF[1] to PUF[1]). The PUF signals (PUF[1] to PUF[1]) may be collected to generate the security key KEY. Here, the PUF signal (PUF[1] to PUF[1]) equates to the conversion signal (PUF) of FIG. 1.

In a conventional design, at each challenge, the existing integrated circuit of the physically unclonable function was able to output PUF signals of different inputs, using the same circuit structure. This is problematic because the integrated circuit is vulnerable to attacks of machine learning, even in the case where the PUF signals are collected over multiple challenges to generate the security key KEY.

For example, assuming that each PUF signal is 10 bits and the number of challenges to be performed is 10 in an existing integrated circuit. In such a case, the number of security keys KEY generated may be a value corresponding to 100*square of 2 or (100*2*2).

To overcome the potential vulnerability described above, according to an embodiment, the integrated circuit of according to some embodiments of the present disclosure may be configured to change its internal connection structure for each challenge to be more robust against machine learning attacks and may therefore provide improved security performance.

For example, as shown in FIG. 2, in a first challenge, the integrated circuit 1 may have an internal connection structure of a third configuration (Config[3]), and thus output a first PUF signal (PUF[1]) to the input.

In a second challenge, the integrated circuit may have an internal connection structure of a fifth configuration (Config[5]), and thus output a second PUF signal (PUF[2]) to the input.

In a third challenge, the integrated circuit may have an internal connection structure of a second configuration (Config[2]), and thus output a third PUF signal (PUF[3]) to the input.

In this way, by changing the internal connection structure of the integrated circuit for each challenge, PUF signals may be diversely combined, and security performance may be improved accordingly.

Figure 3:
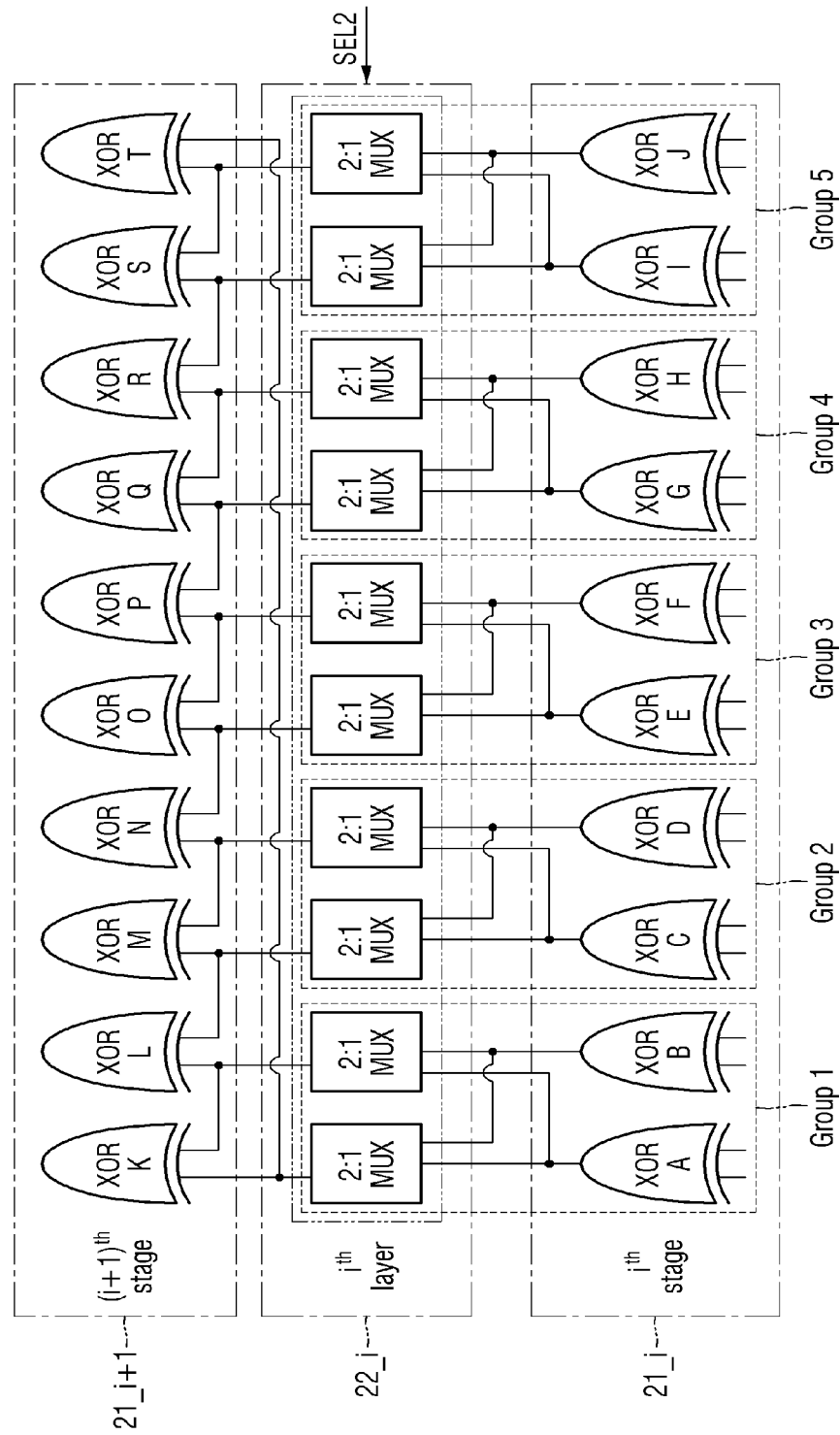
FIG. 3 is an exemplary circuit diagram for explaining the conversion unit included in the integrated circuit according to an embodiment.
Figure 4:
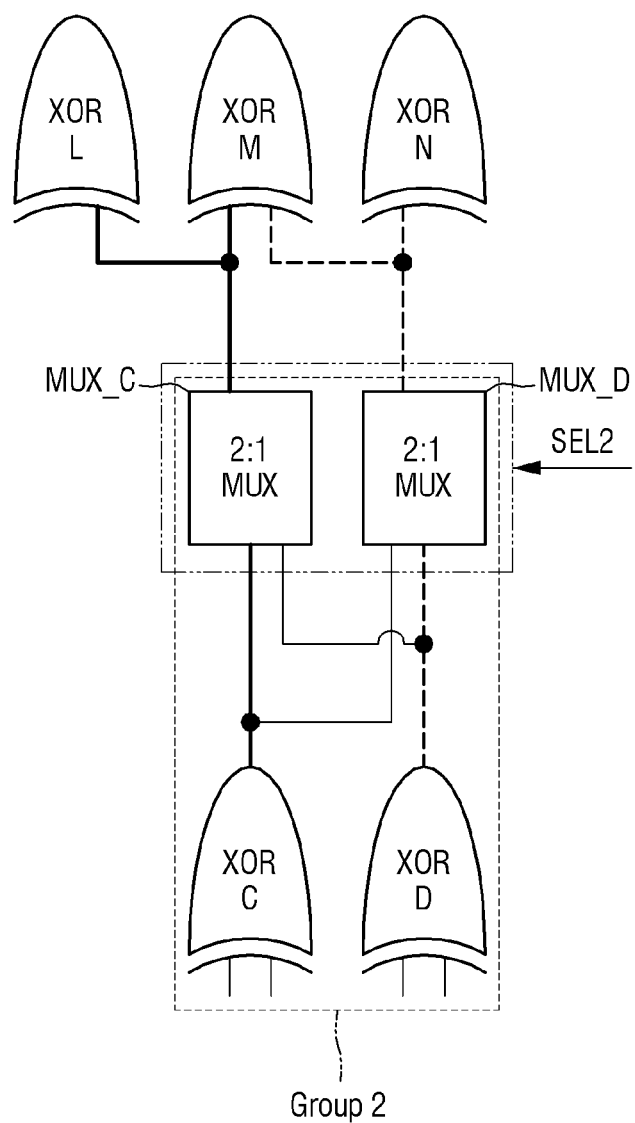
FIGS. 4 and 5 are exemplary circuit diagrams for showing the operation of the conversion unit according to an embodiment.
Figure 5:
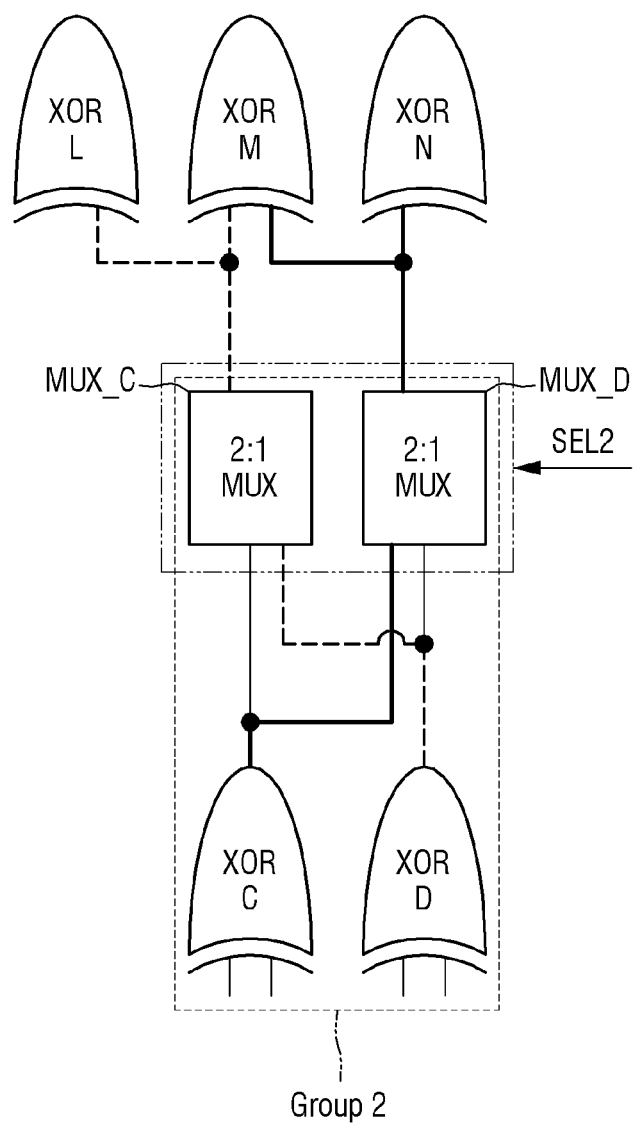

FIG. 3 is an exemplary circuit diagram illustrating the conversion unit 20 included in the integrated circuit 1 according to an example embodiment. FIGS. 4 and 5 are exemplary circuit diagrams for illustrating the operation of the conversion unit 20 according to example embodiments.

Referring now to FIG. 3, there is depicted a circuit diagram which shows an $i^{th}$ stage 21_$i$, an $(i+1)^{th}$ stage 21_$i$+1, and an $i^{th}$ layer configured between the $i^{th}$ stage 21_$i$ and the $(i+1)^{th}$ stage 21_$i$+1, from among the different layers of the conversion unit included in the integrated circuit.

Referring to FIG. 3, the $i^{th}$ stage 21_$i$ may include a plurality of logical gates as illustrated in FIG. 1, and the $(i+1)^{th}$ stage 21_$i$+1 may also include a plurality of logical gates. Specifically, the number of logical gates included in the $i^{th}$ stage 21_$i$ may be the same as the number of logical gates included in the $(i+1)^{th}$ stage 21_$i$+1.

The $i^{th}$ stage 21_$i$ and the $(i+1)^{th}$ stage 21_$i$+1 may be formed by XOR gates, and may include, for example, ten XOR gates. In other embodiments, the number of XOR gates may be other than ten.

The $i^{th}$ layer 22_$i$ may include a plurality of multiplexers. For example, the $i^{th}$ layer 22_$i$ may include ten multiplexers as shown in FIG. 3, and each multiplexer may be configured to output one input from among the two applied inputs. However, the embodiment is not limited thereto. That is, the number of inputs that are input to each of the multiplexers may vary according to the embodiment.

Further, the number of multiplexers included in the $i^{th}$ layer 22_$i$ and the number of logical gates included in the $i^{th}$ stage 21_$i$ and the $(i+1)^{th}$ stage 21_$i$+1 do not necessarily need to be the same and may vary according to the embodiment.

Further, the number of multiplexers may be organized according to groupings. Specifically, in the present example, five groups (Groups) may be defined in relation to the $i^{th}$ stage 21_$i$ and the $i^{th}$ layer 22_$i$.

Specifically, as shown in FIG. 3, a first group (Group 1) may include an A XOR gate and a B XOR gate of the $i^{th}$ stage 21_$i$, and two multiplexers which receive the outputs of the two gates as inputs.

A second group (Group 2) may include a C XOR gate and a D XOR gate of the $i^{th}$ stage 21_$i$, and two multiplexers which receive the outputs of the two gates as inputs.

A third group (Group 3) may include an E XOR gate and an F XOR gate of the $i^{th}$ stage 21_$i$, and two multiplexers which receive the outputs of the two gates as inputs.

A fourth group (Group 4) may include a G XOR gate and an H XOR gate of the $i^{th}$ stage 21_$i$, and two multiplexers which receive the outputs of the two gates as inputs.

A fifth group (Group 5) may include an I XOR gate and a J XOR gate of the $i^{th}$ stage 21_$i$, and two multiplexers which receive the outputs of the two gates as inputs.

As an example, the $i^{th}$ layer 22_$i$ may receive the second selection signal SEL2 and determine the output on the basis of the second selection signal SEL2. Specifically, each of the multiplexers included in the $i^{th}$ layer 22_$i$ receives any one of the different signals included in the second selection signal SEL2 and may determine the output provided to the $(i+1)^{th}$ stage 21_$i$+1 on the basis of the signal.

More specifically, for ease of explanation referring to FIGS. 4 and 5, the second group (Group2) will be described by way of example. The C multiplexer MUX_C and D multiplexer MUX_D included in the second group (Group2) may each receive the second selection signal SEL2. Each of the C multiplexer MUX_C and the D multiplexer MUX_D may receive one of a plurality of signals included in the second selection signal SEL2, and the signal provided to the C multiplexer MUX_C and the signal provided to the D multiplexer MUX_D may be different from each other.

Each of the C multiplexer MUX_C and the D multiplexer MUX_D may receive the output of the C XOR gate and the D XOR gate as input, and each of the C multiplexer MUX_C and the D multiplexer MUX_D may output different outputs from among the output of the C XOR gate and the output of the D XOR gate.

For example, in FIG. 4, the C multiplexer MUX_C may receive the output of the C XOR gate and the output of the D XOR gate and output the output (indicated by a thick line) of the C XOR gate from among the C XOR and the D XOR outputs. Conversely, the D multiplexer MUX_D may receive the output of the C XOR gate and the output of the D XOR gate and output the output (indicated by a dotted line) of the D XOR gate from among the C XOR and the D XOR outputs.

In contrast to the FIG. 4 example, in FIG. 5, the C multiplexer MUX_C receives the output of the C XOR gate and the output of the D XOR gate and may output the output (shown by a dotted line) of the D XOR gate from among the C XOR and the D XOR outputs. Conversely, the D multiplexer MUX_D receives the output of the C XOR gate and the output of the D XOR gate and may output the output (indicated by a thick line) of the C XOR gate from among the C XOR and the D XOR outputs.

That is, the output values of each multiplexer is determined by the second selection signal SEL2, thus allowing the internal connection structure of the integrated circuit to be changed accordingly.

Referring again to FIG. 3$n$, $i^{th}$ layer 22_$i$ is shown to include ten multiplexers, and as described in FIGS. 4 and 5, each group may set two paths independently of each other, on the basis of the second selection signal SEL2. Therefore, the number of outputs generated by the $i^{th}$ layer 22_$i$ may correspond to 32, which is 5*the square of 2.

Alternatively, the input provided to the $(i+1)^{th}$ stage 21_$i$+1 may be independent of a relationship between the $i^{th}$ layer 22_$i$ and the $i^{th}$ stage 22_$i$.

For example, the value output from the C multiplexer MUX_C of the second group (Group 2) is input to the L XOR gate and the M XOR gate of the first $(i+1)^{th}$ stage 21_$i$+1, and the other input of the L XOR gate may correspond to the output of the first group (Group 1). Therefore, the more layers there are, the more conversion signals there may be.

Figure 6:
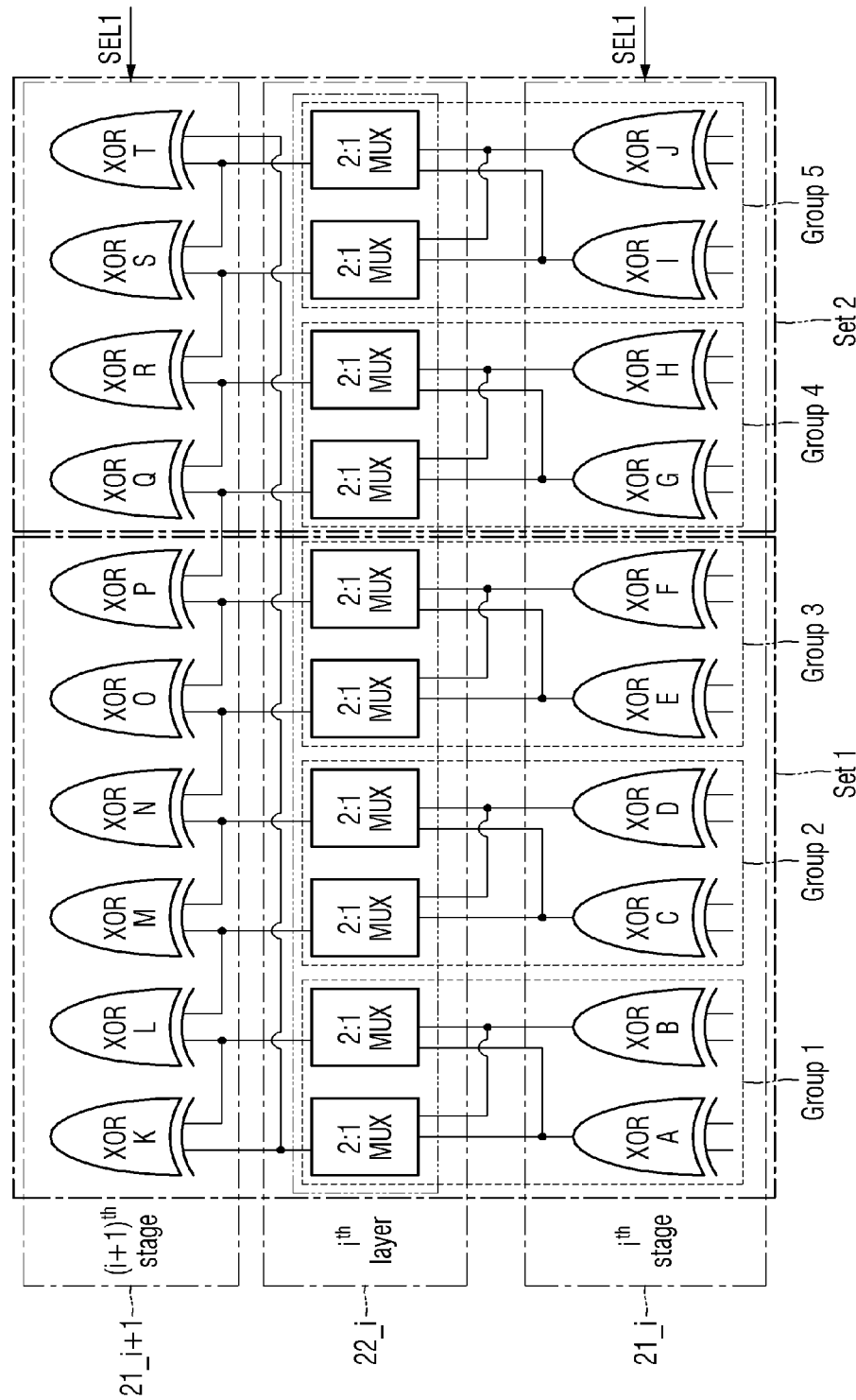
FIG. 6 is an exemplary circuit diagram for explaining the operation of the conversion unit according to an embodiment.

FIG. 6 is an exemplary circuit diagram illustrating the operation of the conversion unit according to an example embodiment.

Referring to FIG. 6, the conversion unit 20 may receive the first selection signal SEL1. The conversion unit 20 may activate at least a part of the plurality of logical gates included in the $i^{th}$ stage 21_$i$ and the $(i+1)^{th}$ stage 21_$i$+1 on the basis of the first selection signal SEL1 and deactivate the rest.

For example, the conversion unit 20 may activate all gates beginning with the A XOR gate and ending with the F XOR gate and deactivate all gates beginning with the G XOR gate and ending with the J XOR gate from among the gates included in the $i^{th}$ stage 21_$i$. Similarly, the conversion unit 20 may activate all of the gates beginning with the K XOR gate and ending with the P XOR gate and deactivate all of the gates beginning with the Q XOR gate and ending with the T XOR gate from among the gates included in the $(i+1)^{th}$ stage 21_$i$+1.

The conversion unit 20 may convert the signal through the activated first set (Set 1) from among the first set (Set 1) and the second set (Set 2). As an example, the number of bits input to the activated set may be defined as the Width. That is, using FIG. 6 as an example, the value of Width may correspond to 6 because gates A through F have been activated.

As described above, the integrated circuit according to embodiments of the present disclosure may change the output of the multiplexer included in the plurality of layers on the basis of the selection signal and may also change the number of logical gates that are activated, among the logical gates included in the plurality of stages. As a result, there may be a larger number of conversion signals resulting in an improvement in security performance.

FIG. 7 is an exemplary table illustrating the operation of the conversion unit according to an example embodiment.

Referring to FIG. 7, a configuration label may be equated to an index number that is defined for all of the cases that may be generated according to changes in the internal connection structure in the integrated circuit.

As described in FIGS. 3 to 6, there may be a number of cases corresponding to a value of (Width/2*square of 2) for one layer. Further, when there are multiple "m" layers, because the outputs of each layer are independent of each other, the total number of cases of the internal connection structures that the integrated circuit may have may correspond to a value of (m*Wide)/2*square of 2).

A plurality of layer selection signals may be provided for each number of cases. Specifically, if the configuration labels are different, that is, if the structure of the integrated circuit is changed, at least one of the selection signals provided to each of the plurality of layers may have different values.

Conversely, selection signals that are different from each other may be provided to each layer. For example, if the configuration label is 0, the value of the selection signal provided to the first layer may correspond to 000 . . . $0_2$, the value of the selection signal provided to the second layer may correspond to 001 . . . $0_2$, and the value of the selection signal provided to the $m^{th}$ layer may correspond to 011 . . . $0_2$.

Further, as described above, the plurality of multiplexers included in each layer may receive any one of a plurality of different signals included in the selection signal received by the layer.

Figure 8:
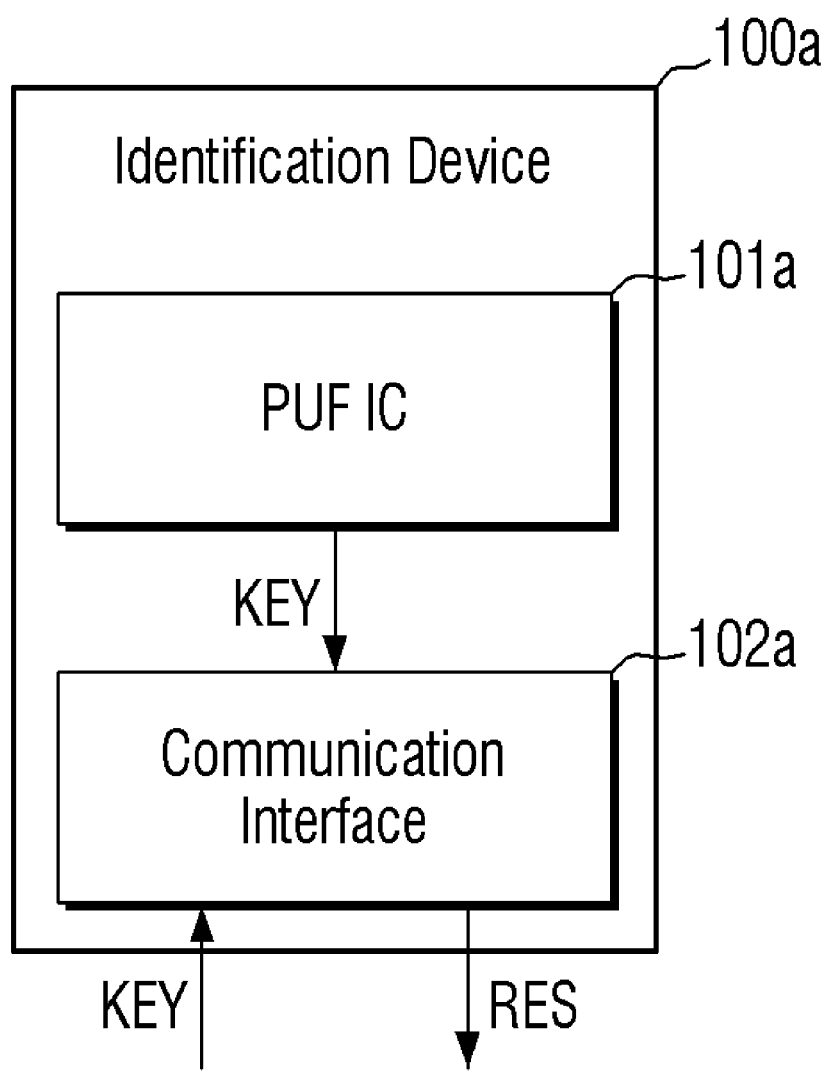
FIG. 8 is an exemplary block diagram of an apparatus including the integrated circuit of physically unclonable function according to an embodiment.

FIG. 8 is an exemplary block diagram of an apparatus including the integrated circuit of a physically unclonable function according to an example embodiment.

Referring to FIG. 8, an identification device 100a may include a PUF integrated circuit 101a (PUF IC) and a communication interface 102a.

The identification device 100a may transmit a response RES including the identification information of the identification device 100a to outside of the identification device 100a in response to the request RQ received from outside of the identification device 100a. The identification device 100a may be, for example, radio frequency identification (RFID).

The identification information included in the response RES transmitted by the identification device 100a may be used to identify the user of the identification device 100a. The identification information included in the response RES may be generated on the basis of the security key KEY generated by the PUF integrated circuit 101a.

Figure 9:
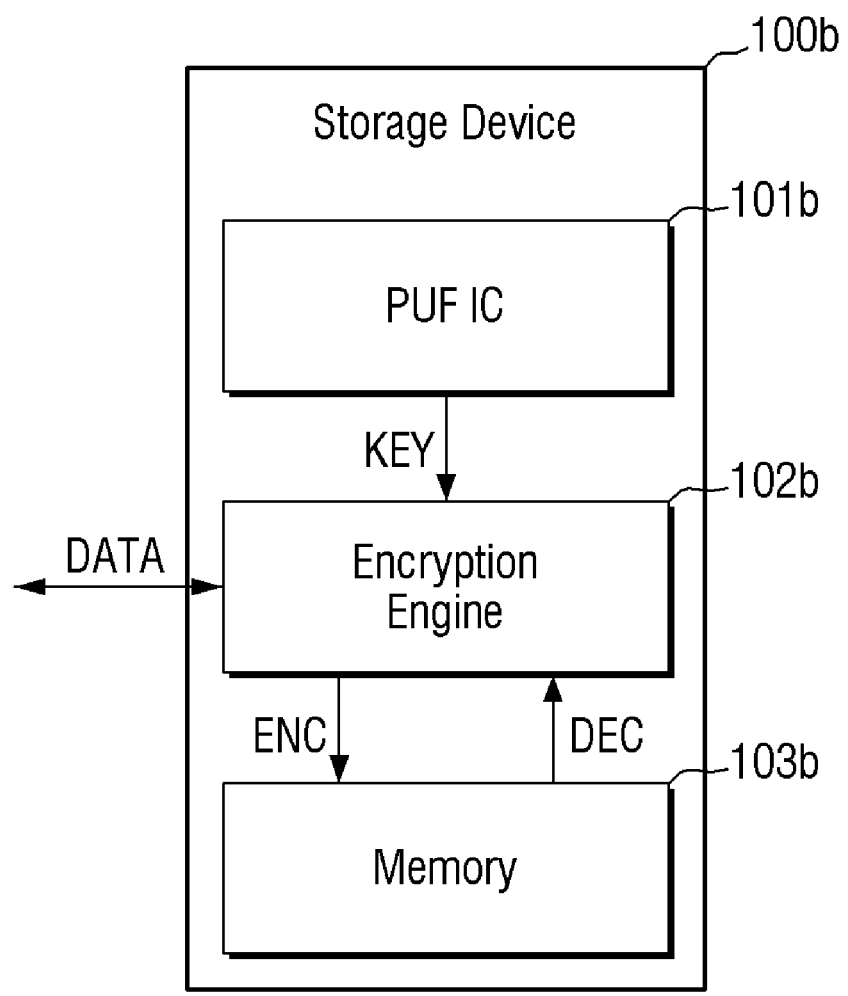
FIG. 9 is an exemplary block diagram of an apparatus including the integrated circuit of physically unclonable function according to an embodiment.

FIG. 9 is an exemplary block diagram of an apparatus including the integrated circuit of physically unclonable function according to an example embodiment.

Referring to FIG. 9, a storage device 100b may include a PUF integrated circuit 101b, an encryption engine 102b, and a memory 103b.

The storage device 100b may store the data DATA received from outside of the storage device 100b and transmit the stored data DATA to outside of the storage device 100b. For the security of the stored data, the storage device 100b may encrypt the data DATA received from outside of the storage device 100b using the security key KEY and store the encrypted data ENC in the memory 103b. The storage device 100b may be, for example, a portable storage device or a storage device of a storage server.

The encryption engine 102b may decrypt the encrypted data DEC that is read from the memory 103b, using the security key KEY, and may transmit the decrypted data DATA to outside of the storage device 100b.

Figure 10:
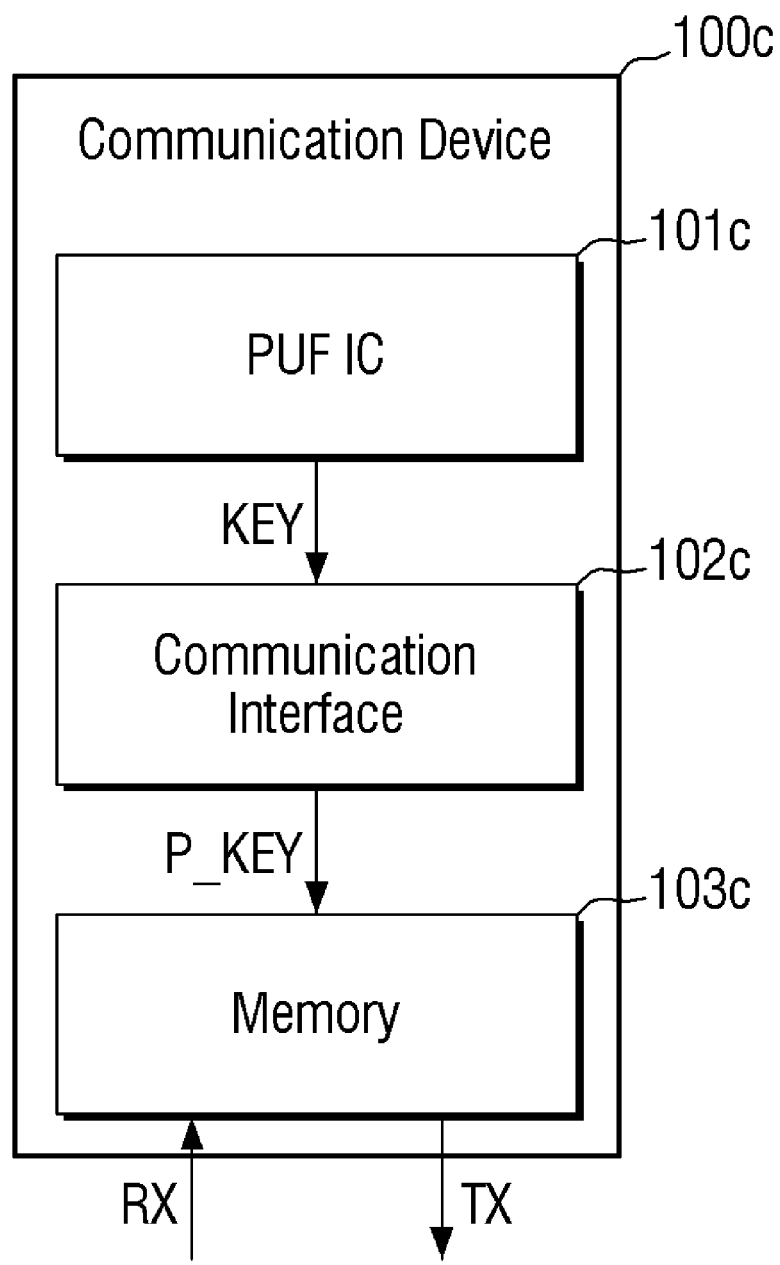
FIG. 10 is an exemplary block diagram of an apparatus including the integrated circuit of physically unclonable function according to an embodiment.

FIG. 10 is an exemplary block diagram of an apparatus including the integrated circuit of a physically unclonable function according to an example embodiment.

Referring to FIG. 10, a communication device 100c may include a PUF integrated circuit 101c, a public key generator 102c, and a modem 103c.

The communication device 100c may communicate with another communication device, by receiving the signal RX from the other communication device or transmitting the signal TX to the other communication device. The communication device 100c may be, for example, a portable wireless communication device.

The public key generator 102c may generate the public key P_KEY on the basis of the security key KEY generated by the PUF integrated circuit 101c.

The modem 103c may transmit the encrypted signal TX and decode the signal RX on the basis of the public key P_KEY.

That is, the communication device 100c may perform secured communications with another communication device on the basis of the security key KEY.

Figure 11:
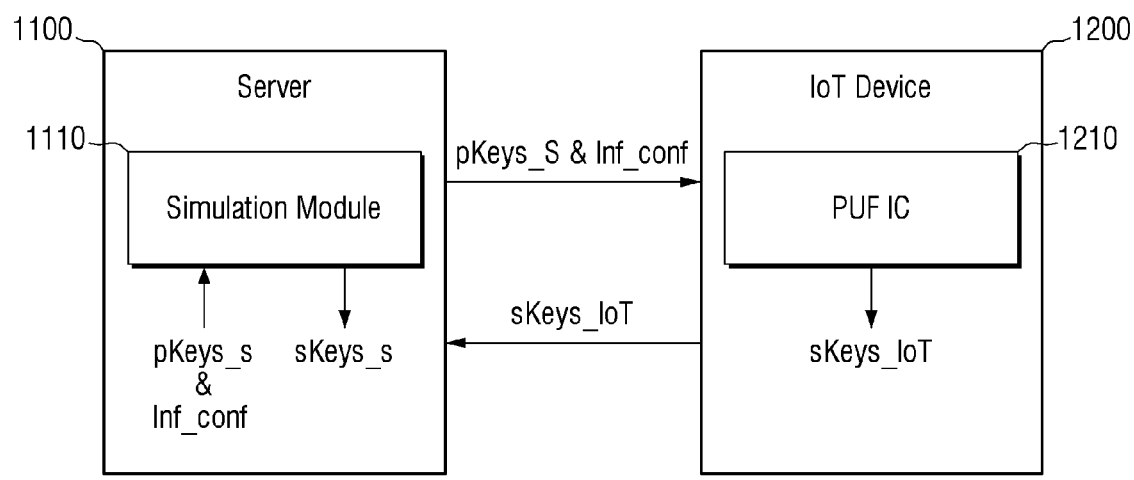
FIG. 11 is an exemplary block diagram for explaining a server system between the apparatus device including the integrated circuit according to an embodiment.

FIG. 11 is an exemplary block diagram of a server system between the apparatus device including the integrated circuit according to an example embodiment.

Referring to FIG. 11, the server system 1000 may include a server 1100 and an IoT (Internet of Things) device 1200.

The server 1100 may include a simulation module 1100. The simulation module 1100 may generate a server secret key sKeys_s, using a server public key pKeys_s and configuration information Inf_conf.

Here, the server public key pKeys_s specify information required to generate the server secret key sKeys_s. For example, the server public key pKeys_s may include information such as the initial value and the time.

Here, the configuration information Inf_conf may include information about the internal connection structure of the conversion unit according to each configuration label described in FIG. 7.

The server 1100 may provide the server public key pKeys_s and the configuration information Inf_conf to the IoT device 1200.

The IoT device 1200 may include a PUF integrated circuit 1210. Here, the PUF integrated circuit 1210 may correspond to the integrated circuit described in FIGS. 1 to 7 and may further correspond to be substantially the same as the PUF integrated circuit described in FIGS. 8 to 10.

The IoT device 1200 may receive the server public key pKeys_s and the configuration information Inf_conf from the server 1100. Accordingly, the PUF integrated circuit 1210 may generate an IoT secret key sKeys_IoT, using the received server public key pKeys_s and the configuration information Inf_conf. The server 1100 and the IoT device 1200 may be in an advanced state of information sharing regarding the internal connection structure of the PUF integrated circuit 1210 where the information shared corresponds to the configuration information Inf_conf provided by the server 1100. The IoT device 1200 may provide the generated IoT secret key sKeys_IoT to the server 1100.

Figure 12:
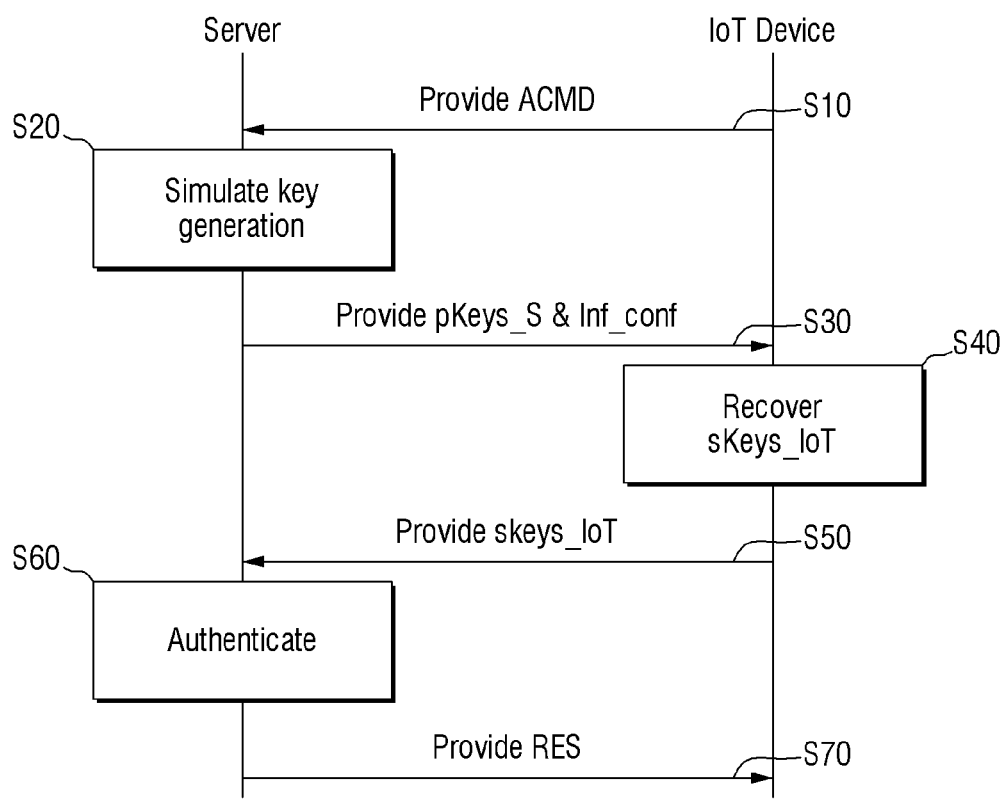
FIG. 12 is an exemplary flowchart for explaining the operation of a server system between the apparatus including the integrated circuit according to an embodiment.

FIG. 12 is an exemplary state diagram describing the operation of a server system between the apparatus including the integrated circuit according to an example embodiment.

Referring to FIG. 12, the IoT device may initially provide an access command CAMD to the server to access the server (S10). The access command CAMD may be a command provided by the IoT device to be authenticated through the server.

The server may perform a simulation operation of the key generation in response to the reception of the access command CAMD from the IoT device (S20). That is, the server may perform a simulation which generates a key using the simulation module 1110 of FIG. 11. Specifically, step S20 is a step in which the PUF circuit of the IoT device is virtually used to generate a key thereof. As described in FIG. 11, the server may generate the server secret key, using the server public key and the configuration information.

The server may provide the server public key and the configuration information to the IoT device (S30). Here, the configuration information may include information about the internal connection structure of the PUF circuit in which the server is included in the IoT device.

The IoT device may recover the IoT secret key, using the received server public key and configuration information (S40). Specifically, the IoT device may recover the IoT secret key, using the received server public key and configuration information on the basis of the internal PUF circuit.

The IoT device may provide the IoT secret key to the server (S50).

The server may perform an authentication process (S60). Specifically, the server may check whether the generated server secret key is the same as the received IoT secret key.

The server may provide a response (RES) to the IoT device as the output of the authentication process (S70). For example, the server may provide an accessible response (RES) to the IoT device, when the server secret key is the same as the IoT secret key. Conversely, the server may provide an inaccessible response (RES) to the IoT device, when the server secret key is not the same as the IoT secret key.

As stated above, the server system may provide additional configuration information to the IoT device as compared to previous configurations of the server system. The IoT device may generate the secret key, only when using the configuration information. This makes it possible to further improve the security performance in the server system.

In conclusion, those skilled in the art will appreciate that many variations and modifications may be made to the preferred embodiments without substantially departing from the principles of the inventive concept. Therefore, the disclosed preferred embodiments of the disclosure are used in a generic and descriptive sense only and not for purposes of limitation.

What is claimed is:

1. An integrated circuit comprising:
   a PUF block including a plurality of physically unclonable function (PUF) cells, each PUF cell being configured to output a cell signal having a unique value according to an input challenge, wherein the cell signals output by the plurality of PUF cells is a first signal;
   a select signal generator configured to provide a plurality of selection signals;
   a conversion unit configured to receive the plurality of selection signals from the select signal generator and the first signal from the PUF block, convert the first signal into a plurality of conversion signals on the basis of the plurality of selection signals, and output the plurality of conversion signals; and
   a key generator configured to receive the plurality of conversion signals from the conversion unit, and generate a security key,
   wherein the conversion unit includes a first layer comprises a first and second conversion block receiving a second signal and different selection signal among the plurality of selection signals, respectively, and configured to output a third signal, by converting the second signal, on the basis of the plurality of selection signals from the select signal generator,
   wherein the conversion unit further includes a plurality of stages and a plurality of layers, alternately disposed, wherein the plurality of stages each receive a first selection signal of the plurality of selection signals and the plurality of layers each receive a second selection signal of the plurality of selection signals,
   wherein the width of the conversion unit is configured to change according to the first selection signal, and
   the first signal is converted into a conversion signal of the plurality of conversion signals on the basis of a bit value of the second selection signal defining an internal connection structure of each group of the plurality of groups.

2. The integrated circuit of claim 1, wherein each layer of the plurality of layers of the conversion unit includes at least two multiplexers (MUX), and
   wherein the number of multiplexers included in each layer is the same.

3. The integrated circuit of claim 1, wherein the bit value of the second selection signal during a first challenge is different from the bit value of the second selection signal during a second challenge.

4. The integrated circuit of claim 1, wherein the conversion unit further comprises:
   a first stage including a plurality of first logical gates of the plurality of logical gates configured to receive a plurality of corresponding inputs of the first signal, perform a logical operation on the first signal and output a second signal;
   a second layer configured to receive a second signal, output a third signal by converting the second signal on the basis of a bit value of a second selection signal of the plurality of selection signals; and
   a second stage including a plurality of second logical gates, configured to receive the third signal, perform a logical operation on the third signal output a fourth signal.

5. The integrated circuit of claim 4, wherein the number of the first logical gates included in the first stage is the same as the number of the second logical gates included in the second stage.

6. The integrated circuit of claim 4,
   wherein the conversion unit deactivates a first logical gate of at least a part of the first stage on the basis of the first selection signal, and
   wherein the conversion unit deactivates a second logical gate of at least a part of the second stage on the basis of the first selection signal.

7. The integrated circuit of claim 6, wherein the number of deactivated first logical gates of the first stage is the same as the number of deactivated second logical gates of the second stage.

8. The integrated circuit of claim 4, wherein the logical operation is an XOR operation.

* * * * *